United States Patent [19]

Miller

[11] 4,277,530

[45] Jul. 7, 1981

[54] ELECTRICAL STEEL LAMINATION

[75] Inventor: Robert F. Miller, New Kensington, Pa.

[73] Assignee: Allegheny Ludlum Steel Corporation, Pittsburgh, Pa.

[21] Appl. No.: 73,812

[22] Filed: Sep. 10, 1979

[51] Int. Cl.[3] ........................ B32B 15/18; H01F 27/24

[52] U.S. Cl. .................................... 428/216; 336/219; 428/415; 428/416; 428/433; 428/436; 428/450; 428/457; 428/460; 428/471; 428/469

[58] Field of Search ............... 428/433, 436, 415, 539, 428/471, 416, 460, 457, 450, 216; 336/219

[56] References Cited

U.S. PATENT DOCUMENTS

| | | | |
|---|---|---|---|
| 2,561,462 | 7/1951 | Compton | 336/219 |
| 3,045,133 | 7/1962 | Ashe | 336/219 |
| 3,160,509 | 12/1964 | Schaefer | 336/219 |
| 3,533,861 | 10/1970 | Foster | 336/219 |
| 3,554,966 | 1/1971 | Jones | 336/219 |
| 3,670,278 | 6/1972 | Foster | 336/219 |
| 3,924,022 | 12/1975 | Schroeter | 336/219 |
| 4,032,673 | 6/1977 | Schroeter | 336/219 |

*Primary Examiner*—Ellis P. Robinson
*Attorney, Agent, or Firm*—Vincent G. Gioia; William J. O'Rourke, Jr.

[57] ABSTRACT

A laminated article for electrical applications is disclosed which comprises at least two sheets of electrically isolated electrical steel each having a thickness of less than 0.020 inch, and an adhesive between adjacent sheets bonding the adjacent sheets to one another without creating significant compressive stress in the plane of the sheets. The adhesive is characterized by substantially instantaneous bonding at a temperature less than 750° F.

17 Claims, No Drawings

ELECTRICAL STEEL LAMINATION

BRIEF SUMMARY OF THE INVENTION

The present invention relates to a laminated article and, more particularly, to an adhesively bonded electrical steel lamination for electrical applications. The laminated article of the present invention may be used in electrical devices such as transformers, generators or electric motors.

A continuing objective in the use of electrical steels in electrical applications is to reduce the energy loss associated with magnetization of the electrical steel sheet. It has been disclosed in the prior art, such as U.S. Pat. No. 2,561,462, that employing thinner gage electrical steel sheets for such use is desirable. The reason for the desirability of thinner gage electrical steel sheets in electrical applications is that a thin gage reduces the path over which magnetically induced eddy currents may flow.

At the present time a large proportion of the electrical steel sheet produced for applications, such as electric power transformers, falls within a thickness range of from 0.010 to 0.015 inch (0.025 to 0.040 mm). It appears that the lower limit for conventional sheet thickness of electrical steel sheet is, to a large extent, determined by the manufacturing considerations of the consumer of these materials who fabricates the electrical device from the electrical steel sheet. Thin gage electrical steel sheet, such as 0.010 inch silicon steel strip and 0.002 inch amorphous strip material, is, understandably, more susceptible to damage during handling and fabrication. Also, the thinner gage electrical sheet often requires additional labor in the fabrication of various electrical devices. In summary, it is well known that more energy efficient devices such as transformers may be made by decreasing the thickness of the electrical steel strip, however, manufacturing considerations have placed a practical lower limit on the thickness of the strip which may be economically and successfully fabricated into electrical devices.

The prior art discloses coatings for electrical steel sheets used in electrical applications. For example, U.S. Pat. No. 3,160,509 discloses the use of a high temperature insulative refractory coating, specifically chromic oxide, which is tightly adherent to the surface of silicon steel strip material and serves as an annealing separator for the silicon steel. U.S. Pat. No. 3,670,278 pertains to a glass coating applied at relatively high bonding temperatures onto the surface of sheets of electrical steel which hold the sheet in tension to reduce magnetostriction and strain sensitivity and thereby reduce the noise level in a transformer employing such sheets. Also, U.S. Pat. No. 4,032,673 discloses the use of irradiation curable solventless organic resins as an additional coating to improve the insulating characteristics of oriented silicon steel having an underlying inorganic insulating coating. However, there is a need for adhesively bonded electrical steel laminations in which the adhesive does not create significant compressive stress in the plane of the sheets and in which the adhesive bonds at temperatures less than about 750° F.

Accordingly, a new and improved electrical steel sheet is desired which combines the improved electrical properties of very thin electrical steel sheet with the practical manufacturing economy of fabricated thicker sheets.

The present invention may be summarized as providing a new and improved laminated article for electrical applications comprising at least two sheets of electrically isolated electrical steel each having a thickness of less than 0.020 inch, and an adhesive between adjacent sheets bonding the adjacent sheets to one another without creating significant compressive stress in the plane of the sheet. The adhesive is characterized by substantially instantaneous bonding at a temperature less than 750° F. In a preferred construction, the adhesive layer of the laminated article of the present invention exhibits a bond strength of at least 1,000 pounds per square inch as measured in uniaxial tension.

An objective of the present invention is to provide a laminated electrical steel article which combines the low energy loss characteristics and advantages of using thinner sheets of silicon steel, with the inherent manufacturing economies of handling and processing thicker electrical steel articles. In particular, the silicon steel sheets in the composite article of the present invention are bonded at a temperature below about 750° F. with sufficient strength to permit the composite article to be subjected to routine processing operations, including coiling, shearing, mitering, trimming and punching, without causing the composite article to delaminate. Simultaneously, the adhesive bonding of adjacent sheets does not create undesirable stresses in the plane of the sheets.

An advantage of the present invention is that the use of thinner sheets may become commercially accepted without requiring modification of conventional manufacturing processes and operations.

A primary objective of the present invention is to provide a laminated silicon steel article comprised of multiple sheets of electrically isolated silicon steel bonded at a relatively low temperature with an adhesive which does not create significant compressive stress in the plane of the sheet which could impair the electrical and magnetic properties of the laminated article.

Another advantage of the present invention is to provide the ability to utilize thinner sheets of electrical steels in conventional magnetic manufacturing processes for making transformers, electric power motors, generators and the like, in order to reduce the energy loss associated with the magnetization of thicker electrical steel sheets.

A further advantage of the present invention is to provide a laminated electrical steel article bonded by an adhesive which is compatable with the high temperature operating environments of electric transformers such as about 100° C. above ambient temperature in which such articles may be employed. Specifically, the adhesive used in the laminated article of the present invention does not decompose in such environment to contaminate dielectric oils used in typical devices, and further withstands prolonged exposure to such oils at elevated temperatures without degradation, decomposition or delamination.

These and other objectives and advantages of this invention will be more fully understood and appreciated with reference to the following description.

DETAILED DESCRIPTION

The electrical steel sheets, or silicon steel sheets, used in the laminated article of the present invention are ferrous base metal sheets, or preferably an iron silicon alloy containing up to about 6% silicon, by weight, and more preferably containing about 3% silicon. The electrical sheets of the present invention are typically grain oriented silicon steel sheets having a thickness of less than about 0.020 inch. However, non-oriented grades of silicon steel, amorphous metal strip materials and numerous other electrical alloys may be employed in the laminated article of this invention, particularly for applications wherein the use of thinner gage strip materials yield improved watt loss characteristics.

In accordance with the present invention, a laminated article, or composite structure, is provided by adhesively bonding two or more sheets of electrical steel. As will be explained in more detail below, the resulting composite structure has the physical and mechanical integrity required for conventional fabrication and successful performance in an electrical device, and the electrical and magnetic properties which are far superior to any known single sheet of electrical steel of a thickness comparable to the total thickness of the composite structure.

The adhesive which is used to bond adjacent sheets of electrical steel in the laminated article of the present invention must be characterized by substantially instantaneous bonding at a temperature below about 750° F. Such adhesive also provides adequate bond strength when used along thin glue lines. In particular, for steel strip having a thickness of less than about 0.020 inch, the stacking factor of the laminated article of the present invention as well as for the electrical device manufactured with the laminated article of the present invention should exceed at least 90%, and more preferably should exceed 95%. To obtain a stacking factor of greater than 90%, the adhesive layers should have a total thickness of less than 10% of the total article thickness. Relatively high stacking factors, i.e., in excess of 95%, may be necessary in order to maximize the amount of electrical steel which is employed in the finished device. It will be understood by those skilled in the art that stacking factors less than 90%, and perhaps as low at 75% may be tolerable for certain laminated articles such as amorphous strip materials.

The strength of the bond between adjacent sheets of electrical steel in the laminated article of the present invention must be sufficient to permit subsequent handling and fabricating operations. The laminated article of the present invention is intended to be shipped to a manufacturer of electrical devices. Therefore, it is understandable that the laminated article will be coiled, sheared, edge trimmed, mitered, and punched as it passes through typical operations used in the manufacturing of electrical devices such as transformers. Therefore, the bond strength of the adhesive layer between adjacent sheets must be sufficient to permit such handling and fabrication without causing the composite article to delaminate. For example, it has been found that a bond strength of at least about 1,000 pounds per square inch may be sufficient to bond silicon steel sheets to permit subsequent manufacturing operations without causing delamination. However, for such sheets bond strengths in excess of 2,000 psi are preferred. Such bond strength should be measured in uniaxial tension.

The laminated article of the present invention is intended to be manufactured into electrical devices such as transformers which typically use dielectric oils at elevated temperatures during operation. The adhesive in the laminated article of the present invention should retain its bond strength in such operating environment. Also, in cases where the intended use is for electric power transformers, the bonding adhesive should not contaminate the dielectric oils used in these devices. Further, the bond should not degrade or decompose upon exposure to such environment at elevated temperatures over prolonged operating periods.

The adhesive bonding of two or more sheets of electrical steel with an adhesive, such as that used in the laminated article of the present invention, requires that special attention be taken to avoid excessive residual stresses. It is well known that the presence of compressive stresses acting parallel to the sheet rolling direction in the case of grain oriented silicon steel cause severe degradation of both magnetostriction and watt loss characteristics. Residual stresses are generally removed in conventional single-sheet practice by a high temperature stress relief annealing operation. A high temperature stress relief anneal typically 1400° F. and above cannot be applied to the composite structures of the present invention because exposure to such high temperatures would cause the adhesive to melt, resulting in delamination of the article.

The particular adhesive chosen to bond the electrical steel sheets in the laminated article of the present invention should exhibit certain characteristics. In particular, the adhesive should be thermoplastic, i.e., have the ability to soften at elevated temperatures on the order of 300° to 600° F. Thermoplasticity is the common property of a variety of plastics and resins which facilitates the application of the adhesive to the sheets in the article of the present invention. The adhesive should also have the ability to adhere to a smooth or glassy surface. The adhesive should be characterized by rapid curing. In this regard, it has been found to be beneficial for the adhesive is characterized by substantially instantaneous bonding at a temperature of less than 750° F. As explained above in more detail, the adhesive must demonstrate adequate bond strength when used along thin glue lines. Also, as explained in more detail above, the adhesive should be resistant to attack in dielectric oils at such elevated operating temperatures.

It is known that exposure to high temperatures may have an adverse affect upon the magnetic properties of silicon steel strip material. For this reason, as well as for practical manufacturing reasons, the adhesive utilized to bond strip materials should not require high curing temperatures. To minimize degradation of electrical properties, the adhesive of the present invention should bond, substantially instantaneously at a temperature below about 750° F. Such relative low bonding temperature requirement for the adhesive is critical in instances where amorphous strip material is bonded because amorphous strip materials recrystallize when exposed to temperatures above about 750° F.

Exemplary materials which may be used to adhesively bond electrical steel sheets in the laminated article of the present invention include phenolic adhesives which are characterized by rapid curing without liberation of by-products, such as acetic acid which is liberated during the curing of silicon rubber adhesives. Certain high strength, flexible epoxy adhesives which exhibit the properties listed above may also be employed. A specific material which may be used to bond the electrical steel sheets is PA-4459 adhesive, a product manufactured and sold by 3M Company of St. Paul, Minnesota. PA-4459 is a clear, amber colored synthetic resin based adhesive which utilizes a ketone-alcohol solvent.

Curvature of silicon steel sheets bonded into the laminated article of the present invention must be minimized to prevent the creation of harmful residual stress in the sheets. Bonded electrical steel composites of two or more sheets may be treated as a single, uniform sheet of multiple thickness for purposes of calculating residual stresses. The stresses encountered during bending of the composite steel sheet may be calculated from the following equation:

Equation I $$\sigma = Ed/2R$$

where:

- $\sigma$ = maximum stress acting on a sheet, either tensile or compressive,
- E = Young's modulus of the sheet in the direction parallel to the resulting stress,
- d = sheet thickness of the bonded structure, and
- R = radius of curvature.

Due to the stress-sensitive nature of silicon steels it is desirable to insure that significant compressive stress is not created in the plane of sheets. In this context, the magnitude of compressive stresses should be limited to a maximum value less than about 1,000 psi in the service condition. More particularly, the sum of, or total residual compressive stresses acting in the plane of the bonded sheet, whether coated or not, should be below about 1,000 pounds per square inch. It will be understood that residual compressive stresses may be imparted by a variety of mechanical, chemical and structural sources. Such sources include the adhesive, the substrate coatings, curvature of the strip, thermal stress, strip shape, temperature differentials during bonding, curing of the adhesive, thermal expansion differentials between the sheet and a coating, and the like. It is the total residual compressive stresses acting in the plane of the sheet which could adversely affect the properties of the lamination and, therefore, should be held below about 1,000 psi.

As mentioned above, stress could be created by curvature of the article. The minimum radius of curvature produces the maximum stress and the magnitude of stress depends on the final thickness of the adhesively bonded composite. For example, consider a bonded composite article comprised of two individual grain-orinted electrical steel sheets each having a thickness equal to 0.011 inch. Young's modulus in the rolling direction of the sheet is about $17\times10^6$ psi. The total composite article thickness is slightly greater than 0.022 inch. The minimum radius of curvature allowable to prevent residual stresses in excess of 1,000 psi may be calculated from Equation I as R = 187 inches. Radii of curvature smaller than 187 inches result in excessive residual stresses present in the composite sheet when the strip is constrained to lie flat, as in a transformer. For the purposes of this specification, excessive residual stresses are those in excess of 1,000 pounds per square inch.

The conditions which may result in small radii of curvature could arise from improperly flattened sheet when used as the starting material for bonding. Another cause of curvature may be due to temperature differentials between the sheets as they are being bonded. The radius of curvature of a bonded pair of sheets of equal thickness resulting from temperature differentials may be calculated from the following equation:

Equation II $$R = \left[\frac{1 + \alpha\,(T - To)}{\alpha\Delta T}\right] d$$

- R = radius of curvature at To (the service temperature),
- $\alpha$ = coefficient of thermal expansion ($12\times10^{-6}$/°C.),
- T = bonding temperature of the colder sheet,
- To = service temperature,
- $\Delta T$ = temperature differential between the sheets at the time of bonding, and
- d = thickness of an individual sheet of the bonded pair.

The passage of adhesively bonded electrical steel strip over rolls having a relatively small radius of curvature may also result in severe damage to the composite article. The minimum radius of rolls tolerable in the processing of the bonded strip material of the present invention may be calculated by setting the value of stress to be less than the yield strength of the material and solving Equation I, above, for the tolerable radius of curvature. For example, for a bonded strip of grain oriented silicon steel with thickness equal to 0.022 inch and a yield strength of 35,000 psi, the minimum tolerable roll radius would be about 11 inches.

The primary utility of forming laminated articles of electrical steel sheets is the provision of a material which is ideally suited to the conventional manufacture of commercial electrical devices, such as transformers. The composite articles of the present invention are bonded at sufficient strength to insure that they are highly resistant to delamination during subsequent forming operations. Furthermore, such composite articles possess electrical and magnetic properties far superior to those of a single sheet of electrical steel of equal thickness. The following examples describe the preparation of electrical steel laminated articles of this invention and illustrate the electrical and magnetic properties obtained.

EXAMPLE 1

Ten panels of high tension coated grain oriented silicon steel were adhesively bonded into pairs using a thermoplastic resin, specifically 3M Company PA-4459 adhesive. Magnetic tests were performed on the individual sheets and on the sheets taken as pairs before bonding. The panels, 26 inches by 12 inches, were press bonded with the thermoplastic resin at a temperature of 350° F. (175° C.) for two minutes under a load of 250 psi (2 $MNm^{-2}$) using a 0.001 inch (0.025 mm) glue line thickness. The stacking factor exceeded approximately 95% for each laminated article. The bonded electrical steel composite articles were tested magnetically, subjected to various cutting operations, then examined for delamination and tested for electrical isolation of the individual electrical steel sheets. Table I below lists the pertinent magnetic test data.

TABLE I

| | | | | Pairs of Sheets | |
|---|---|---|---|---|---|
| Individual Sample | Gate (inches) | Individual Sheets WPP at* 17 KG | Pair Sample | Before Bonding WPP at 17 KG | After Bonding WPP at 17 KG |
| 1 | .0108 | .692 | | | |
| 2 | .0109 | .682 | 1 & 2 | .746 | .789 |
| 3 | .0108 | .682 | | | |
| 4 | .0110 | .708 | 3 & 4 | .760 | .861 |

TABLE I-continued

| Individual Sample | Gate (inches) | Individual Sheets WPP at* 17 KG | Pair Sample | Pairs of Sheets Before Bonding WPP at 17 KG | After Bonding WPP at 17 KG |
|---|---|---|---|---|---|
| 5 | .0109 | .667 | | | |
| 6 | .0108 | .682 | 5 & 6 | .729 | .842 |
| 7 | .0107 | .668 | | | |
| 8 | .0107 | .721 | 7 & 8 | .767 | .879 |
| 9 | .0131 | .950 | | | |
| 10 | .0136 | .938 | 9 & 10 | 1.000 | 1.114 |

*Watts per pound at 17,000 gauss

The watt loss measured on samples from Table I tested as pairs before bonding is somewhat greater than the average for the two panels tested as individual sheets. This increase is believed to result primarily from variations in the path of magnetic flux which occur when the sheets are tested as pairs and cannot occur when the sheets are tested individually. This gives rise to local areas of the sheets which operate at significantly higher magnetic inductions than the average. Watt losses increase with the square of the magnetic induction, and therefore increase the total watt loss measured. Testing the sheets as pairs before bonding does not cause a degradation of the electrical sheet, but reflects more accurately the watt losses which might be experienced in service where several laminations are operating at an average induction.

The bonded laminated articles for the above example were less than 5% thicker than the total thickness of the individual panels. The minor additional thickness was due to the thin, 0.001 inch, glue line. A small increase in the watt losses of the bonded electrical sheets occurred, ranging from 5 to 16% above that of the pairs tested before adhesive bonding. This increase is due in part to the increased sample weight used to calculate the magnetic induction, and partially due to minor undesirable stresses present in the bonded composite.

Samples of the laminated articles of this example were subsequently sheared and slit from the electrical steel composites. The sheared and slit samples exhibited no delamination of the individual, bonded electrical sheets. Continuity tests made on the samples cut from the bonded composite article showed that electrical isolation of the sheets was maintained, since no short circuit path had been created between the adjacent electrical steel sheets.

EXAMPLE II

Eighteen additional, 24 inch×10 inch, panels of conventional grain oriented silicon steel were adhesive bonded using the technique described above for Example I. Samples 11 through 16 were finish coated with a high tension coreplate. Samples 17 through 24 were finish coated with a conventional phosphate glass coreplate applied over a mill glass, magnesium silicate, coating. Samples 25 through 28 had a mill glass base coating only. By way of explanation, silicon steels may be generally coated with an annealing separator, such as magnesia, prior to a high temperature annealing operation. The reaction product of magnesia with silica on the strip surface is primarily comprised of forsterite, $Mg_2SiO_4$. Such forsterite layer is usually called the base coating. The term "coreplate" refers to a finish coating, typically a phosphate glass based material, which is applied to the strip over the base coating, or to a bare strip surface in which the base coating has been removed. High tension coreplates generally are finish coatings which place the underlying strip in biaxial tension to reduce watt losses, lessen strain sensitivity and improve magnetostriction. It should be understood that the electrical steel sheets in the laminated article of the present invention should be electrically isolated by a coating. Such coating may be those discussed herein. Alternatively, the adhesive layer may not only bond the sheets, but may also serve as the electrically isolative coating. Table II below summarizes the magnetic test data taken on these samples prior to and following adhesive bonding.

TABLE II

| Individual Sample | Gage (inches) | Individual Sheets WPP at 17 KG | Pair Sample | Pairs of Sheets Before Bonding WPP at 17 KG | After Bonding WPP at 17 KG |
|---|---|---|---|---|---|
| 11 | .0134 | 1.000 | | | |
| 12 | .0133 | .970 | 11 & 12 | 1.010 | 1.079 |
| 13 | .0135 | .902 | | | |
| 14 | .0142 | .998 | 13 & 14 | 1.000 | 1.098 |
| 15 | .0138 | .911 | | | |
| 16 | .0136 | .945 | 15 & 16 | .962 | 1.022 |
| 17 | .0112 | .790 | | | |
| 18 | .0112 | .802 | 17 & 18 | .812 | 1.196 |
| 19 | .0113 | .760 | | | |
| 20 | .0109 | .798 | 19 & 20 | .792 | 1.342 |
| 21 | .0115 | .840 | | | |
| 22 | .0130 | .901 | 21 & 22 | .891 | 1.158 |
| 23 | .0125 | .911 | | | |
| 24 | .0113 | .821 | 23 & 24 | .879 | 1.000 |
| 25 | .0105 | .841 | | | |
| 26 | .0103 | .857 | 25 & 26 | .872 | 1.588 |
| 27 | .0100 | .860 | | | |
| 28 | .0106 | 1.010 | 27 & 28 | .950 | 1.630 |

The data in Table II above illustrate the utility of high tension finish coatings as substrates for electrical isolation of bonded laminations. The electrical steel composites may exhibit a radius of curvature which places the inner-electrical steel sheet in a compressive stress state. In the case where adhesives are used to create the bond between the sheets in the composite article, compressive stresses may also be introduced in the electrical steel sheet by the setting or curing of the adhesive itself. High tension finish coatings, such as those employed on samples 11 through 16, counteract the undesirable compressive stresses and limit the increase in watt loss associated with bonding.

Conventional phosphate glass coreplate is less successful as a finish coating for electrical steels employed in electrical steel laminated articles. Such bonded composites do counteract some undesirable residual stresses in the electrical steel sheet, and in general provide excellent electrical insulation, as do high tension coatings, which prevent eddy current flow between adjacent laminations.

The watt loss increase following bonding of the electrical steel sheets in Example II was greatest in samples 25 through 28 where the surfaces of the electrical steel sheets were coated only by a mill glass. This phenomenon is believed to be due to the relatively poor suppression of residual stresses by mill glass coatings.

It should also be noted that samples sheared and slit from the electrical steel composites listed in Table II showed no delamination of the individual sheets irespective of the type of electrical steel coating employed.

EXAMPLE III

Four electrical steel composite samples generated in Example II above were thermally flattened in a box furnace in air by placing the bonded panels on a flat bed plate having a radius of curvature greater than 900 inches (23 meters), and heating or annealing, the panel for ten minutes at a temperature of 400° F. The samples were allowed to air cool on removal from the furnace and were magnetically tested. The results of magnetic testing are given in Table III below.

TABLE III

| Pair Sample | Before Bonding WPP at 17 KG | After Bonding WPP at 17 KG | After Flattening WPP at 17 KG |
|---|---|---|---|
| 13 & 14 | 1.000 | 1.098 | .995 |
| 15 & 16 | .962 | 1.022 | .972 |
| 17 & 18 | .812 | 1.196 | .828 |
| 19 & 20 | .792 | 1.342 | .805 |

No delamination of the individual electric steel sheets occurred as a result of the flattening operation. As can be seen from the data in Table III, the watt losses of all bonded specimens after thermal flattening approached those measured prior to bonding. The advantage of high tension finish coatings is dependent upon the extent of undesirable stresses in the composite structure which are tolerable. Providing that curvature and bonding stresses can be adequately relieved by the above described flattening operation most coatings may be suitable for electrical steel sheets.

Whereas, the particular embodiments of this invention have been described above for purposes of illustration, it will be apparent to those skilled in the art that numerous variations of details may be made without departing from the invention.

I claim:

1. A laminated article for electrical applications comprising:

at least two sheets of electrical steel strip material, each having a thickness of less than 0.020 inch, each sheet being electrically isolated by a coating, a thermoplastic adhesive layer having a thickness less than or equal to 0.001 inch between adjacent sheets, bonding the adjacent sheets to one another with a bond strength of at least 1,000 pounds per square inch as measured in uniaxial tension, without creating significant compressive stress in the plane of the sheets, said adhesive characterized by substantially instantaneous bonding at a temperature of less than 750° F.

2. A laminated article as set forth in claim 1 wherein the electrical steel is an iron-silicon alloy.

3. A laminated article as set forth in claim 2 wherein the iron-silicon alloy electrical steel is grain oriented.

4. A laminated article as set forth in claim 1 wherein the total residual compressive stresses acting in the plane of the sheet are less than 1,000 pounds per square inch.

5. A laminated article as set forth in claim 1 wherein the strip material is amorphous.

6. A laminated article as set forth in claim 5 wherein the amorphous strip material has a thickness of less than about 0.006 inch.

7. A laminated article as set forth in claim 3 wherein the thickness of each iron-silicon steel sheet is greater than about 0.006 inch.

8. A laminated article as set forth in claim 1 wherein the adhesive layer is resistant to attack in dielectric oils.

9. A laminated article as set forth in claim 8 wherein the adhesive layer is resistant to attack in dielectric oils at elevated operating temperatures.

10. A laminated article as set forth in claim 1 wherein the adhesive layer thickness is less than 10% of the total composite thickness.

11. A laminated article as set forth in claim 1 wherein the adhesive layer thickness is less than 5% of the total composite thickness.

12. A laminated article as set forth in claim 1 wherein the electrically isolative coating is selected from the group consisting of phosphate glass, magnesium silicate, and phosphate glass over magnesium silicate.

13. A laminated article as set forth in claim 1 wherein the electrically isolative coating is a high tension coating.

14. A laminated article as set forth in claim 1, 6 or 7 wherein the adhesive layer serves as the electrically isolative coating.

15. A laminated article as set forth in claim 1 wherein the bond strength of the adhesive layer between adjacent sheets is greater than 2,000 pounds per square inch measured in uniaxial tension.

16. A laminated article for electrical applications comprising:

at least two sheets of grain oriented silicon steel, each sheet having a thickness of less than 0.015 inch, each sheet being electrically isolated by a coating, and a thermoplastic adhesive layer having a thickness less than or equal to 0.001 inch between adjacent sheets, bonding the adjacent sheets to one another with bond strength of at least 2,000 pounds per square inch as measured in uniaxial tension, without creating compressive stress in excess of 1,000 pounds per square inch in the plane of the sheets, and said adhesive characterized by substantially instantaneous bonding at a temperature of less than 750° F.

17. A laminated article as set forth in claim 16 wherein the grain oriented silicon steel sheets are electrically isolated by a high tension coreplate coating.

* * * * *